(12) United States Patent
Wu et al.

(10) Patent No.: US 9,461,737 B2
(45) Date of Patent: Oct. 4, 2016

(54) METHOD FOR DETECTING FIBER JUMPER CONNECTION AND APPARATUS FOR DETECTING FIBER JUMPER CONNECTION

(71) Applicant: HUAWEI TECHNOLOGIES CO., LTD., Shenzhen, Guangdong (CN)

(72) Inventors: Shiquan Wu, Shenzhen (CN); Yangxian Li, Shenzhen (CN); Guochang Jia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 10 days.

(21) Appl. No.: 14/554,464

(22) Filed: Nov. 26, 2014

(65) Prior Publication Data
US 2015/0078742 A1    Mar. 19, 2015

Related U.S. Application Data

(63) Continuation of application No. PCT/CN2012/086029, filed on Dec. 6, 2012.

(30) Foreign Application Priority Data

May 30, 2012    (CN) .......................... 2012 1 0173419

(51) Int. Cl.
*H04B 10/079*    (2013.01)
*H04Q 1/12*    (2006.01)
(Continued)

(52) U.S. Cl.
CPC ............ *H04B 10/079* (2013.01); *H04Q 1/136* (2013.01); *G02B 6/3895* (2013.01)

(58) Field of Classification Search
CPC ..... H04Q 1/136; H04Q 1/138; G02B 6/3895
See application file for complete search history.

(56) References Cited

U.S. PATENT DOCUMENTS 5,821,510 A * 10/1998 Cohen ................. G02B 6/3807
                                                    235/375
8,731,405 B2 * 5/2014 Renfro, Jr. ........... G02B 6/3878
                                                    398/117
(Continued)

FOREIGN PATENT DOCUMENTS

CN    101964680    2/2011
CN    101982797    3/2011
(Continued)

OTHER PUBLICATIONS

Extended European Search Report mailed Jun. 19, 2015 for corresponding European Patent Application No. 12877693.7.
(Continued)

*Primary Examiner* — Nathan Curs
(74) *Attorney, Agent, or Firm* — Staas & Halsey LLP (57) ABSTRACT

Embodiments of the present invention provide a method and an apparatus for detecting a fiber jumper connection. The method includes: receiving first configuration information delivered by a management system, where the first configuration information includes port identities of at least one pair of ports that are supposed to be connected on a fiber distribution device; receiving second configuration information reported by the fiber distribution device; and matching the ports that are supposed to be connected indicated by the first configuration information and the connected ports indicated by the second configuration information to obtain a matching result, where the matching result includes port identities of connected ports and unconnected ports that do not match the ports that are supposed to be connected, thereby improving efficiency of detecting a fiber jumper connection.

14 Claims, 6 Drawing Sheets

(51) Int. Cl.
G02B 6/38 (2006.01)
H04Q 1/02 (2006.01)

(56) References Cited

U.S. PATENT DOCUMENTS

| | | | |
|---|---|---|---|
| 8,837,954 B2 * | 9/2014 | Primm | G06K 7/1097 340/10.52 |
| 2004/0052471 A1 * | 3/2004 | Colombo | G02B 6/3895 385/53 |
| 2005/0078009 A1 * | 4/2005 | Shalts | H04Q 1/06 340/635 |
| 2008/0220721 A1 * | 9/2008 | Downie | G02B 6/38 455/41.3 |
| 2008/0253556 A1 * | 10/2008 | Cobb | H04Q 1/136 379/442 |
| 2010/0210135 A1 * | 8/2010 | German | H04Q 1/138 439/491 |
| 2012/0063767 A1 * | 3/2012 | Wen | G02B 6/3895 398/20 |
| 2013/0051794 A1 | 2/2013 | Han et al. | |
| 2013/0076589 A1 * | 3/2013 | Caveney | H04Q 1/138 343/906 |

FOREIGN PATENT DOCUMENTS

| | | |
|---|---|---|
| CN | 102396172 | 3/2012 |
| CN | 102684784 | 9/2012 |

OTHER PUBLICATIONS

International Search Report mailed Mar. 14, 2013 in corresponding International Application No. PCT/CN2012/086029.

* cited by examiner

METHOD FOR DETECTING FIBER JUMPER CONNECTION AND APPARATUS FOR DETECTING FIBER JUMPER CONNECTION

CROSS-REFERENCE TO RELATED APPLICATION

This application is a continuation of International Application No. PCT/CN2012/086029, filed on Dec. 6, 2012, which claims priority to Chinese Patent Application No. 201210173419.8, filed on May 30, 2012, both of which are hereby incorporated by reference in their entireties.

TECHNICAL FIELD

The present invention relates to information technologies, and in particular, to a method for detecting a fiber jumper connection and an apparatus for detecting a fiber jumper connection.

BACKGROUND

With gradual popularization of fiber to the home, fiber to the premise, fiber to the curb/neighborhood, and fiber to the node, optical distribution network (ODN) technologies are developing rapidly. An ODN device generally has many ports, and the ports are generally connected through fiber jumpers, which results in a plenty of fiber jumpers connected to the ODN device.

In the prior art, a chip for identifying a two-dimensional identification code or an identity (Identity, ID) is usually disposed on a fiber jumper plug, and a reading apparatus identifies the two-dimensional identification code or ID of the fiber jumper plug plugged in each port on the ODN device to determine whether a device port connected to each fiber jumper is correct. However, this method requires the reading apparatus to read two-dimensional identification codes or IDs of fiber plugs one by one, which leads to low efficiency of detecting a fiber jumper connection.

SUMMARY

Embodiments of the present invention provide a method for detecting a fiber jumper connection and an apparatus for detecting a fiber jumper connection to improve efficiency of detecting a fiber jumper connection.

According to one aspect, an embodiment of the present invention provides a method for detecting a fiber jumper connection, including:

receiving first configuration information delivered by a management system, where the first configuration information includes port identities of at least one pair of ports that are supposed to be connected on a fiber distribution device;

receiving second configuration information reported by the fiber distribution device, where the second configuration information includes port identities of at least one pair of connected ports on the fiber distribution device; and matching the ports that are supposed to be connected indicated by the first configuration information and the connected ports indicated by the second configuration information to obtain a matching result, where the matching result includes port identities of connected ports and unconnected ports that do not match the ports that are supposed to be connected.

An embodiment of the present invention provides another method for detecting a fiber jumper connection, including:

reporting second configuration information to an apparatus for detecting a fiber jumper connection, where the second configuration information includes port identities of at least one pair of connected ports on a fiber distribution device, so that the apparatus for detecting a fiber jumper connection matches ports that are supposed to be connected indicated by first configuration information delivered by a management system and the connected ports indicated by the second configuration information to obtain a matching result, where the matching result includes port identities of connected ports and unconnected ports that do not match the ports that are supposed to be connected, and the first configuration information includes port identities of at least one pair of ports that are supposed to be connected on the fiber distribution device.

According to another aspect, an embodiment of the present invention further provides an apparatus for detecting a fiber jumper connection, including:

a receiver, configured to receive first configuration information delivered by a management system, where the first configuration information includes port identities of at least one pair of ports that are supposed to be connected on a fiber distribution device; and receive second configuration information reported by the fiber distribution device, where the second configuration information includes port identities of at least one pair of connected ports on the fiber distribution device; and a matching module, configured to match the ports that are supposed to be connected indicated by the first configuration information and the connected ports indicated by the second configuration information to obtain a matching result, where the matching result includes port identities of connected ports and unconnected ports that do not match the ports that are supposed to be connected.

An embodiment of the present invention further provides a fiber configuration device, including:

a sender, configured to report second configuration information to an apparatus for detecting a fiber jumper connection, where the second configuration information includes port identities of at least one pair of connected ports on a fiber distribution device, so that the apparatus for detecting a fiber jumper connection matches ports that are supposed to be connected indicated by first configuration information delivered by a management system and the connected ports indicated by the second configuration information to obtain a matching result, where the matching result includes port identities of connected ports and unconnected ports that do not match the ports that are supposed to be connected, and the first configuration information includes port identities of at least one pair of ports that are supposed to be connected on the fiber distribution device.

In the method for detecting a fiber jumper connection and the apparatus for detecting a fiber jumper connection provided by the embodiments of the present invention, the apparatus for detecting a fiber jumper connection obtains, from port identities of ports that are supposed to be connected delivered by a management system and port identities of connected ports reported by a fiber distribution device, port identities of connected ports and unconnected ports that do not match the ports that are supposed to be connected, so as to maintain the connection of the ports reported by the fiber distribution device, and improve efficiency of detecting a fiber jumper connection.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
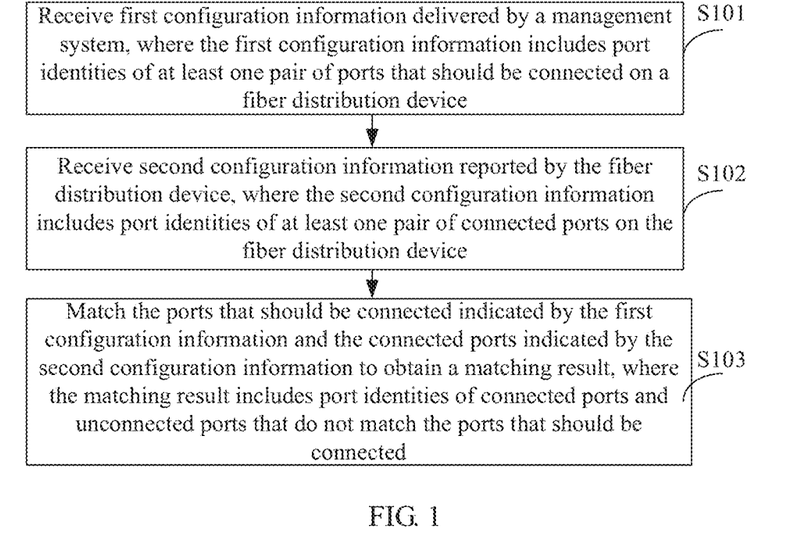
FIG. 1 is a flowchart of an embodiment of a method for detecting a fiber jumper connection provided by the present invention.

FIG. 1 is a flowchart of an embodiment of a method for detecting a fiber jumper connection provided by the present invention. As shown in FIG. 1, the method includes:

S101. Receive first configuration information delivered by a management system, where the first configuration information includes port identities of at least one pair of ports that are supposed to be connected on a fiber distribution device.

S102. Receive second configuration information reported by the fiber distribution device, where the second configuration information includes port identities of at least one pair of connected ports on the fiber distribution device.

S103. Match the ports that are supposed to be connected indicated by the first configuration information and the connected ports indicated by the second configuration information to obtain a matching result, where the matching result includes port identities of connected ports and unconnected ports that do not match the ports that are supposed to be connected.

Figure 2:
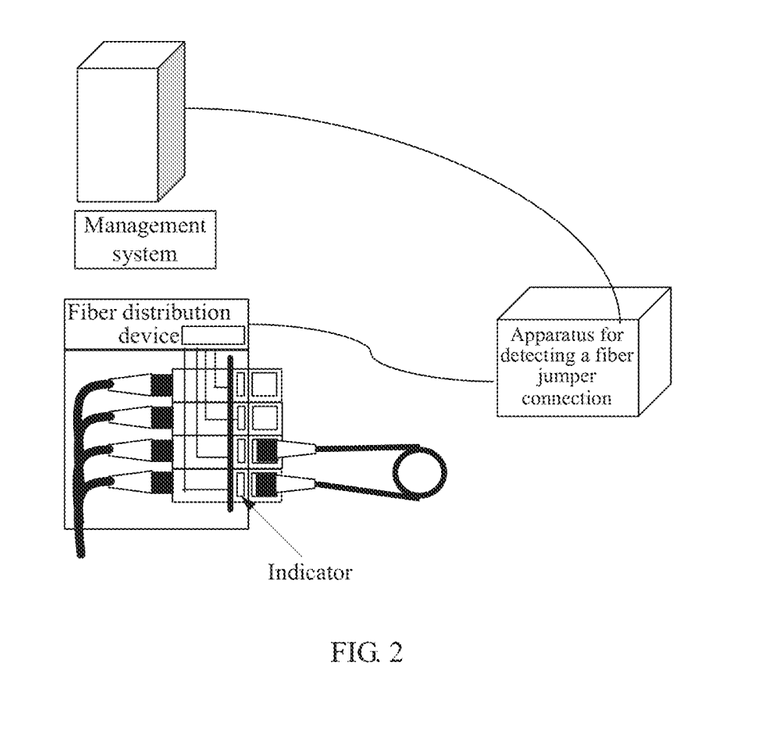
FIG. 2 is a schematic diagram of a connection relationship between devices in the embodiment shown in FIG. 1.

The entity for performing the foregoing steps is an apparatus for detecting a fiber jumper connection. As shown in FIG. 2, the apparatus for detecting a fiber jumper connection may be an auxiliary apparatus for detecting a connection independent from a management device and at least one fiber configuration device such as an intelligent optical distribution network (Intelligent Optical Distribution Network, iODN) device, or may be integrated with the fiber distribution device.

The apparatus for detecting a fiber jumper connection may communicate with the fiber distribution device in a wireless or wired manner, for example, by using a universal serial bus (Universal Serial Bus, USB), a serial port, ZigBee (ZigBee), and so on. The apparatus for detecting a fiber jumper connection may also communicate with the management system in a wireless or wired manner, for example, by using a mobile communications network (2G, 3G, 4G or other systems), wireless fidelity (Wireless Fidelity, WIFI), Worldwide Interoperability for Microwave Access (Worldwide Interoperability for Microwave Access, WiMAX), a copper cable, a fiber jumper, a USB, and so on.

On the fiber jumper mentioned in the embodiment of the present invention, each plug may correspond to a plug identity. The plug identity may be implemented in a form such as an electronic identity (electronic Identity, eID), a two-dimensional identification code (QR), and a radio frequency identification chip (Radio Frequency IDentification, RFID).

The apparatus for detecting a fiber jumper connection mentioned in the embodiment of the present invention can detect a connection state between ports of at least one fiber distribution device. The detection may be performed periodically, or triggered by the management device or the fiber distribution device or the apparatus for detecting a fiber jumper connection according to actual requirements. For example, a man-machine interaction interface may be disposed on the apparatus for detecting a fiber jumper connection, and the detection is triggered by an operator.

As a feasible implementation manner, the management device may use the first configuration information to carry a port identity of each port in the pair of ports that are supposed to be connected on the fiber distribution device, and send the first configuration information to the apparatus for detecting a fiber jumper connection. Likewise, the fiber distribution device can also use the second configuration information to carry the port identity of each port in the pair of connected ports on the fiber distribution device, and send the second configuration information to the apparatus for detecting a fiber jumper connection.

As another feasible implementation manner, in an implementation scenario that the apparatus for detecting a fiber jumper connection needs to detect the connection state between the ports of the fiber distribution device, the apparatus for detecting a fiber jumper connection can request to obtain the first configuration information from the management device, and request to obtain the second configuration information from the fiber distribution device.

After receiving the first configuration information delivered by the management device and the second configuration information reported by the fiber distribution device, the apparatus for detecting a fiber jumper connection can match the ports that are supposed to be connected indicated by the first configuration information and the connected ports indicated by the second configuration information, and determine the port identities of connected ports and unconnected ports that do not match the ports that are supposed to be connected.

It is evident that, when detecting the connection state between the ports of the fiber distribution device, the apparatus for detecting a fiber jumper connection can obtain the port identities of all pairs of connected ports on the fiber distribution device, and match them and the ports that are supposed to be connected indicated by the first configuration information, thereby determining which ports are connected incorrectly and which ports fail to be connected on the fiber distribution device.

After obtaining a matching result, the apparatus for detecting a fiber jumper connection can output the matching result directly, and therefore, according to the matching result, the operator can plug and unplug the connected ports and unconnected ports that do not match the ports that are supposed to be connected. Further, a display module can be disposed in the apparatus for detecting a fiber jumper connection to display the connected ports and unconnected ports that do not match the ports that are supposed to be connected, and display the first configuration information, the second configuration information or man-machine interaction information, and so on.

Further, the matching result may be reported to the management system, so that the management system maintains connection information of ports on the fiber distribution device. Further, the apparatus for detecting a fiber jumper connection can further send the matching result to the fiber distribution device, so that the fiber distribution device turns on indicators on the connected ports and unconnected ports that do not match the ports that are supposed to be connected in the matching result, thereby prompting the operator to perform an operation of plugging or unplugging a fiber jumper for a corresponding port. For example, for the connected ports that do not match the ports that are supposed to be connected, the indicator may flicker quickly to give an indication, whereas for the unconnected ports that do not match the ports that are supposed to be connected, the indicator may flicker slowly to give an indication.

It should be understood that the matching result may further include the connected ports that match the ports that are supposed to be connected. In the process of port connection, the fiber distribution device generally needs to prompt the operator to perform a plugging operation by turning on indicators on two ports to be connected. Therefore, in this implementation scenario, the apparatus for detecting a fiber jumper connection can send the matching result to the fiber distribution device, so that the fiber distribution device turns off the indicators on the connected ports and unconnected ports that match the ports that are supposed to be connected.

Because the fiber distribution device is a passive device, a power supply module such as a battery pack may be disposed in the apparatus for detecting a fiber jumper connection. The apparatus for detecting a fiber jumper connection can supply power to the fiber distribution device so that the fiber distribution device can turn on the indicators on the connected ports and unconnected ports that do not match the ports that are supposed to be connected in the matching result.

In the method for detecting a fiber jumper connection provided by the embodiment of the present invention, the apparatus for detecting a fiber jumper connection obtains, from port identities of ports that are supposed to be connected delivered by a management system and port identities of connected ports reported by a fiber distribution device, port identities of connected ports and unconnected ports that do not match the ports that are supposed to be connected. When detecting a connection state between the ports of the fiber distribution device, the apparatus for detecting a fiber jumper connection can obtain the port identities of all pairs of connected ports on the fiber distribution device, and match them and the ports that are supposed to be connected indicated by first configuration information, thereby determining which ports are connected incorrectly and which ports fail to be connected on the fiber distribution device. In this way, the connection of ports reported by the fiber distribution device can be maintained, and efficiency of detecting a fiber jumper connection is improved.

Figure 3:
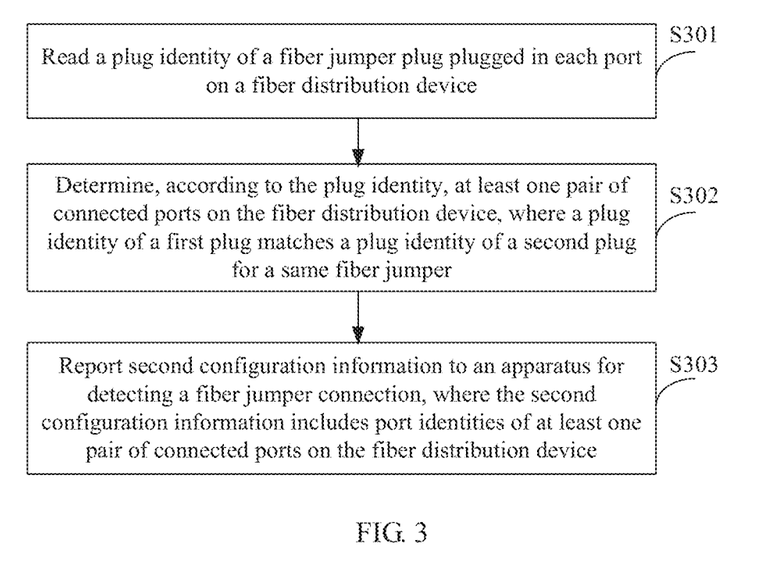
FIG. 3 is a flowchart of yet another embodiment of a method for detecting a fiber jumper connection provided by the present invention.

FIG. 3 is a flowchart of yet another embodiment of a method for detecting a fiber jumper connection provided by the present invention. As shown in FIG. 3, the method includes the following steps:

S301. Read a plug identity of a fiber jumper plug plugged in each port on a fiber distribution device.

S302. Determine, according to the plug identity, at least one pair of connected ports on the fiber distribution device, where a plug identity of a first plug matches a plug identity of a second plug for a same fiber jumper.

S303. Report second configuration information to an apparatus for detecting a fiber jumper connection, where the second configuration information includes port identities of at least one pair of connected ports on the fiber distribution device, so that the apparatus for detecting a fiber jumper connection matches ports that are supposed to be connected indicated by first configuration information delivered by a management system and the connected ports indicated by the second configuration information to obtain a matching result, where the matching result includes port identities of connected ports and unconnected ports that do not match the ports that are supposed to be connected, and the first configuration information includes port identities of at least one pair of ports that are supposed to be connected on the fiber distribution device.

The entity for performing the foregoing steps is the fiber distribution device.

The apparatus for detecting a fiber jumper connection may detect a connection state between ports of at least one fiber distribution device periodically, or as triggered by the management device or the fiber distribution device or the apparatus for detecting a fiber jumper connection according to actual requirements.

The fiber distribution device may also use the second configuration information to carry a port identity of each port in the pair of connected ports on the fiber distribution device, and send the second configuration information to the apparatus for detecting a fiber jumper connection. Alternatively, when a request, for obtaining the second configuration information, sent by the apparatus for detecting a fiber jumper connection is received, the second configuration information is reported to the apparatus for detecting a fiber jumper connection.

The fiber distribution device mentioned in the embodiment of the present invention can read a plug identity of a fiber jumper plug plugged in each port on the fiber distribution device. On the fiber jumper mentioned in the embodiment of the present invention, a plug identity of each plug may be implemented in a form such as an eID, a QR, and an RFID. Therefore, correspondingly, a reader of the eID, the QR or the RFID may be disposed in the fiber distribution device to read the plug identity of the fiber jumper plug.

A plug identity of a first plug matches a plug identity of a second plug for a same fiber jumper. For example, a same plug identity may be set for a first plug and a second plug of a same fiber jumper. Therefore, according to a plug identity of a plug plugged in each port, the fiber distribution device can determine which ports are connected through a same fiber jumper.

As a feasible implementation manner, after obtaining the matching result, the apparatus for detecting a fiber jumper connection may output the matching result directly, so that according to the matching result, the operator can plug and unplug the connected ports and unconnected ports that do not match the ports that are supposed to be connected.

As another feasible implementation manner, the apparatus for detecting a fiber jumper connection can send the matching result to the fiber distribution device. After receiving the matching result sent by the apparatus for detecting a fiber jumper connection, the fiber distribution device can turn on indicators on the connected ports and unconnected ports that do not match the ports that are supposed to be connected in the matching result, thereby prompting the operator to perform an operation of plugging or unplugging a fiber jumper for the corresponding port. An indicator such as a light emitting diode (Light Emitting Diode, LED) indicator may be disposed on each port of the fiber distribution device; or, several ports share a given indicator, where the indicator can give indications by displaying the port identities that share the indicator or by other means.

Because the fiber distribution device is a passive device, the apparatus for detecting a fiber jumper connection can supply power to the fiber distribution device, so that the fiber distribution device can turn on the indicators on the connected ports and unconnected ports that do not match the ports that are supposed to be connected in the matching result. Specifically, before turning on the indicators on the connected ports and unconnected ports that do not match the ports that are supposed to be connected in the matching result, the fiber distribution device can receive a power supply signal from the apparatus for detecting a fiber jumper connection, so as to turn on the indicators.

In the method for detecting a fiber jumper connection provided by the embodiment of the present invention, the fiber distribution device can read a plug identity of a plug plugged in each port on the fiber distribution device, and identify a pair of ports connected through the same fiber jumper, and deliver the port identities of the pair of connected ports to the apparatus for detecting a fiber jumper connection. The apparatus for detecting a fiber jumper connection can compare port identities of ports that are supposed to be connected delivered by the management system and the port identities of the connected ports reported by the fiber distribution device, so as to obtain the port identities of connected ports and unconnected ports that do not match the ports that are supposed to be connected. Because the fiber distribution device can send the port identities of all pairs of connected ports on the fiber distribution device to the apparatus for detecting a fiber jumper connection, the apparatus for detecting a fiber jumper connection can determine which ports are connected incorrectly and which ports fail to be connected on the fiber distribution device, so as to maintain the connection of ports reported by the fiber distribution device and improve efficiency of detecting a fiber jumper connection.

In an implementation scenario that a port on the fiber distribution device needs to be connected through a fiber jumper, the management system can use first connection information to carry the port identities of at least one pair of ports that are supposed to be connected, and deliver the first connection information to the apparatus for detecting a fiber jumper connection. As a feasible implementation manner, after receiving the first connection information delivered by the management system, the apparatus for detecting a fiber jumper connection can send the first connection information to the fiber distribution device, and the fiber distribution device turns on the indicators on each pair of ports sequentially according to the port identities included in the first connection information. That is, the fiber distribution device can turn on the indicators on a pair of ports at a time, and the operator can use one fiber jumper to connect a pair of ports whose indicators are turned on.

Figure 4:
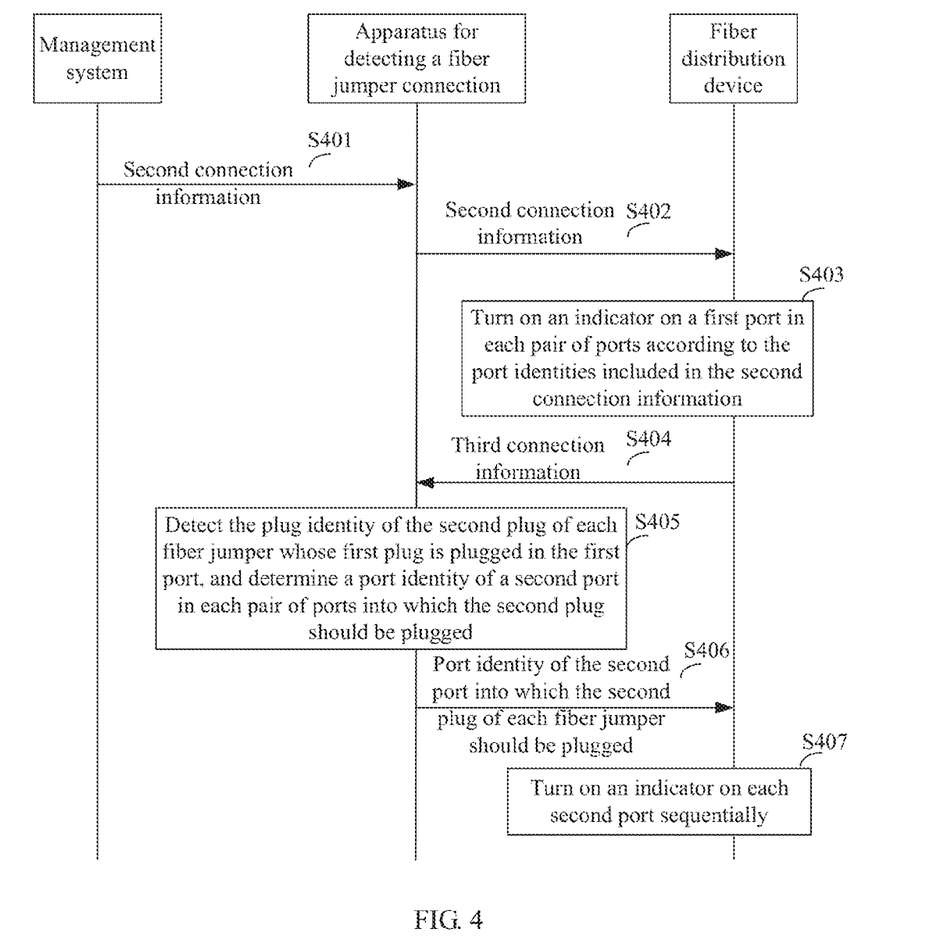
FIG. 4 is a flowchart of an embodiment of a fiber jumper connection method provided by the present invention.
Figure 5:
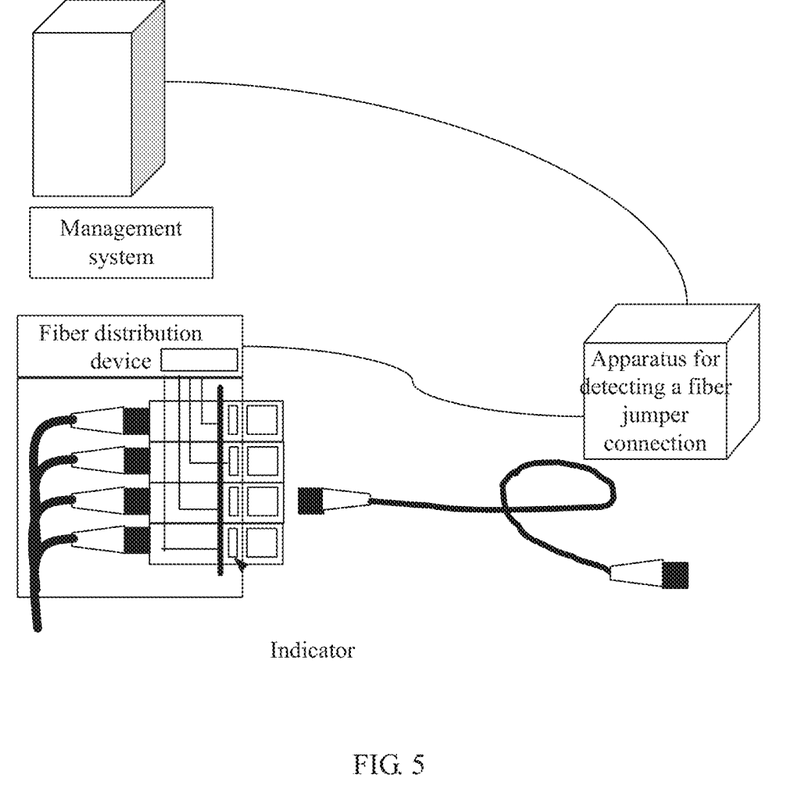
FIG. 5 is a schematic diagram of a connection relationship between devices in the embodiment shown in FIG. 4.

As another feasible implementation manner, if 2 or more pairs of ports are to be connected, as shown in FIG. 4 and FIG. 5, the method for detecting a fiber jumper connection provided by the embodiment may include:

S401. A management system delivers second connection information to an apparatus for detecting a fiber jumper connection, where the second connection information includes port identities of at least two pairs of ports to be connected on a fiber distribution device.

S402. The apparatus for detecting a fiber jumper connection sends the second connection information to the fiber distribution device.

S403. The fiber distribution device turns on an indicator on a first port in each pair of ports according to the port identities included in the second connection information.

The first port is either of each pair of ports. After receiving the second connection information, the fiber distribution device can turn on the indicator on the first port in each pair of ports, and an operator can plug a first plug of a fiber jumper into the first port in each pair of ports. In this case, a second plug of each fiber jumper is not plugged in the port of the fiber distribution device.

S404. The fiber distribution device sends third connection information to the apparatus for detecting a fiber jumper connection, where the third connection information includes a port identity of the first port and a plug identity of the first plug of a fiber jumper plugged in the first port.

After the first plug of the fiber jumper is plugged into the first port in each pair of ports, the fiber distribution device can read the plug identity of the first plug plugged in each first port, and send the port identity of each first port and the plug identity of the first plug of the plugged fiber jumper to the apparatus for detecting a fiber jumper connection.

S405. The apparatus for detecting a fiber jumper connection sequentially detects the plug identity of the second plug of each fiber jumper whose first plug is plugged in the first port, and determines, according to the second connection information and the third connection information, a port identity of a second port in each pair of ports into which the second plug should be plugged, where the plug identity of the first plug matches the plug identity of the second plug for the same fiber jumper.

In this case, the second plug of each fiber jumper is not plugged in the port of the fiber distribution device. Therefore, the apparatus for detecting a fiber jumper connection can detect the plug identity of the second plug of each fiber jumper. Because the plug identity of the first plug matches the plug identity of the second plug for a same fiber jumper, once the plug identity of the second plug of a fiber jumper is detected, the apparatus for detecting a fiber jumper connection can determine, according to the second connection information and the third connection information, the port identity of the second port in each pair of ports into which the second plug should be plugged.

In the implementation scenario of this embodiment, a reader such as eID, QR, or RFID corresponding to the plug identity of the fiber jumper may be disposed in the apparatus for detecting a fiber jumper connection to read the plug identity of the fiber jumper plug.

S406. The apparatus for detecting a fiber jumper connection sequentially sends to the fiber distribution device the port identity of the second port into which the second plug of each fiber jumper should be plugged.

S407. The fiber distribution device turns on an indicator on each second port sequentially.

Each time after obtaining the port identity of the second port in each pair of ports into which the second plug of a fiber jumper should be plugged, the apparatus for detecting a fiber jumper connection can send the port identity of the second port to the fiber distribution device. The fiber distribution device can turn on the indicator on the second port, so that the operator can plug the second plug of the fiber jumper into the second port.

For each fiber jumper, the apparatus for detecting a fiber jumper connection and the fiber distribution device can perform operations in S405 to S407 once until the second plugs of all the fiber jumpers whose first plugs have been plugged into the first ports are plugged into the second port.

Because the fiber distribution device is a passive device, the apparatus for detecting a fiber jumper connection can also supply power to the fiber distribution device, so that the fiber distribution device can turn on the indicator on the first port or the second port.

In the fiber jumper connection method provided by the embodiment of the present invention, in an implementation scenario that a plurality of pairs of ports is to be connected on the fiber distribution device, the apparatus for detecting a fiber jumper connection can send the port identities of the ports to be connected delivered by the management system to the fiber distribution device. The fiber distribution device turns on the indicator on a first port in each pair of ports, so that a first plug of a fiber jumper can be plugged. The fiber distribution device can send a port identity of the first port and a plug identity of the correspondingly plugged first plug to the apparatus for detecting a fiber jumper connection. The apparatus for detecting a fiber jumper connection can detect a plug identity of a second plug of each fiber jumper sequentially, determine a second port corresponding to the second plug of each fiber jumper, and instruct the fiber distribution device to turn on the indicator on the second port sequentially, so that the second plug of the fiber jumper can be plugged, thereby improving efficiency of detecting a fiber jumper connection.

Persons of ordinary skill in the art understand that, all or a part of the steps of the foregoing method embodiments may be implemented by a program instructing relevant hardware. The program may be stored in a computer readable storage medium. When the program runs, the steps of the method embodiments are performed. The storage medium includes various mediums capable of storing program code, such as a ROM, a RAM, a magnetic disk, or an optical disc.

Figure 6:
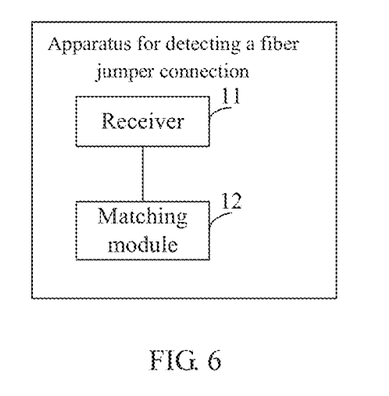
FIG. 6 is a schematic structural diagram of an embodiment of apparatus for detecting a fiber jumper connection provided by the present invention.

FIG. 6 is a schematic structural diagram of an embodiment of an apparatus for detecting a fiber jumper connection provided by the present invention. As shown in FIG. 6, the apparatus includes a receiver 11 and a matching module 12.

The receiver 11 is configured to receive first configuration information delivered by a management system, where the first configuration information includes port identities of at least one pair of ports that are supposed to be connected on a fiber distribution device; and receive second configuration information reported by the fiber distribution device, where the second configuration information includes port identities of at least one pair of connected ports on the fiber distribution device.

The matching module 12 is configured to match the ports that are supposed to be connected indicated by the first configuration information and the connected ports indicated by the second configuration information to obtain a matching result, where the matching result includes port identities of connected ports and unconnected ports that do not match the ports that are supposed to be connected.

Figure 7:
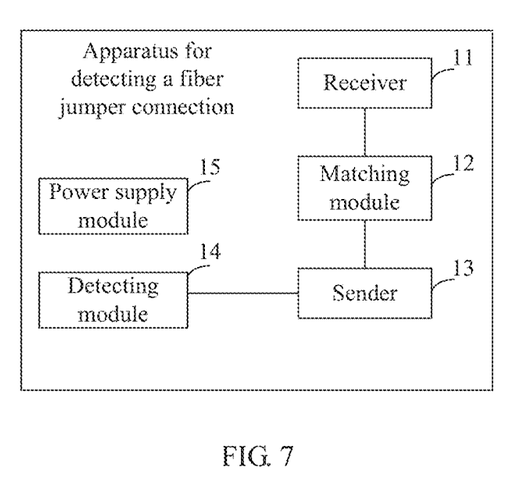
FIG. 7 is a schematic structural diagram of yet another embodiment of an apparatus for detecting a fiber jumper connection provided by the present invention.

FIG. 7 is a schematic structural diagram of yet another embodiment apparatus for detecting a fiber jumper connection provided by the present invention. As shown in FIG. 7, on the basis of the embodiment shown in FIG. 6, the apparatus may further include:

a sender 13, configured to send the matching result to the fiber distribution device, so that the fiber distribution device turns on indicators on the connected ports and unconnected ports that do not match the ports that are supposed to be connected in the matching result.

Optionally, the receiver 11 may be specifically configured to receive first connection information delivered by the management system, where the first connection information includes port identities of at least one pair of ports to be connected on the fiber distribution device; and the sender is further configured to send the first connection information to the fiber distribution device, so that the fiber distribution device turns on indicators on each pair of ports sequentially according to the port identities.

Optionally, the receiver 11 may be further specifically configured to receive second connection information delivered by the management system, where the second connection information includes port identities of at least two pairs of ports to be connected on the fiber distribution device.

Optionally, the sender 13 may be further configured to send the second connection information to the fiber distribution device, so that the fiber distribution device turns on an indicator on a first port in each pair of ports according to the port identities.

The receiver 11 may be further configured to receive third connection information sent by the fiber distribution device, where the third connection information includes a port identity of the first port and a plug identity of a first plug of a fiber jumper plugged in the first port.

Further, the apparatus may further include a detecting module 14, configured to detect a plug identity of a second plug of each fiber jumper whose first plug is plugged in the first port, and determine, according to the second connection information and the third connection information, a port identity of a second port in each pair of ports into which the second plug should be plugged, where the plug identity of the first plug matches the plug identity of the second plug for the same fiber jumper.

Correspondingly, the sender 13 is further configured to send the port identity of the second port to the fiber distribution device sequentially, where the second port is a port into which the second plug of each fiber jumper should be plugged, so that the fiber distribution device turns on an indicator on each second port sequentially.

Further, the apparatus may include:

a power supply module 15, configured to supply power to the fiber distribution device.

The apparatus for detecting a fiber jumper connection provided by the embodiment of the present invention is a device for implementing the method for detecting a fiber jumper connection provided by the embodiment of the present invention. For the specific process of implementing the method for detecting a fiber jumper connection, see the method embodiment, and no description is repeated here any further.

In the apparatus for detecting a fiber jumper connection provided by the embodiment of the present invention, the apparatus for detecting a fiber jumper connection obtains, from port identities of ports that are supposed to be connected delivered by a management system and port identities of connected ports reported by a fiber distribution device, port identities of connected ports and unconnected ports that do not match the ports that are supposed to be connected. When detecting a connection state between ports of the fiber distribution device, the apparatus for detecting a fiber jumper connection can obtain port identities of all pairs of connected ports on the fiber distribution device, and match them and the ports that are supposed to be connected indicated by first configuration information, thereby determining which ports are connected incorrectly and which ports fail to be connected on the fiber distribution device, so as to maintain the connection of ports reported by the fiber distribution device, and improve efficiency of detecting a fiber jumper connection.

Figure 8:
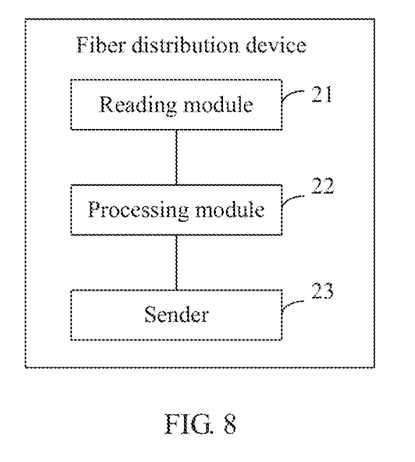
FIG. 8 is a schematic structural diagram of an embodiment of a fiber configuration device provided by the present invention.

FIG. 8 is a schematic structural diagram of an embodiment of a fiber configuration device provided by the present invention. As shown in FIG. 8, the device includes a reading module 21, a processing module 22, and a sender 23.

The reading module 21 is configured to read a plug identity of a fiber jumper plug plugged in each port on a fiber distribution device.

The processing module 22 is configured to determine, according to the plug identity, at least one pair of connected ports on the fiber distribution device, where a plug identity of a first plug matches a plug identity of a second plug for a same fiber jumper.

The sender 23 is configured to report second configuration information to an apparatus for detecting a fiber jumper connection, where the second configuration information includes port identities of at least one pair of connected ports on the fiber distribution device, so that the apparatus for detecting a fiber jumper connection matches ports that are supposed to be connected indicated by first configuration information delivered by a management system and the connected ports indicated by the second configuration information to obtain a matching result, where the matching result includes port identities of connected ports and unconnected ports that do not match the ports that are supposed to be connected, and the first configuration information includes port identities of at least one pair of ports that are supposed to be connected on the fiber distribution device.

Figure 9:
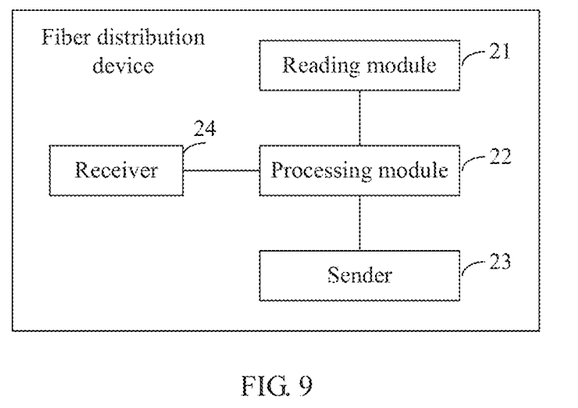
FIG. 9 is a schematic structural diagram of yet another embodiment of a fiber configuration device provided by the present invention.

FIG. 9 is a schematic structural diagram of yet another embodiment of a fiber configuration device provided by the present invention. Indicators are disposed on ports of the fiber configuration device shown in FIG. 9.

Optionally, the device may further include: a receiver 24, configured to receive the matching result sent by the apparatus for detecting a fiber jumper connection; and a processing module 22, configured to turn on indicators on the connected ports and unconnected ports that do not match the ports that are supposed to be connected in the matching result.

Optionally, the receiver 24 may be further configured to receive first connection information sent by the apparatus for detecting a fiber jumper connection, where the first connection information includes port identities of at least one pair of ports to be connected on the fiber distribution device.

Correspondingly, the processing module 22 may be further configured to turn on indicators on each pair of ports sequentially according to the port identities included in the first connection information.

Optionally, the receiver 24 may be further configured to receive second connection information sent by the apparatus for detecting a fiber jumper connection, where the second connection information includes port identities of at least two pairs of ports to be connected on the fiber distribution device.

Further, the sender 23 may be configured to send third connection information to the apparatus for detecting a fiber jumper connection, where the third connection information includes a port identity of a first port and a plug identity of a first plug of a fiber jumper o plugged in the first port.

Further, the receiver 24 may be configured to receive sequentially a port identity of a second port into which a second plug of each fiber jumper should be plugged sent by the apparatus for detecting a fiber jumper connection, and send the port identity to the fiber distribution device.

Further, the processing module 22 may be configured to turn on an indicator on each second port sequentially.

The fiber distribution device provided by the embodiment of the present invention is a device for implementing the method for detecting a fiber jumper connection provided by the embodiment of the present invention. For the specific process of implementing the method for detecting a fiber jumper connection, see the method embodiment, and no description is repeated here any further.

The fiber distribution device provided by the embodiment of the present invention can read a plug identity of a plug plugged in each port on the fiber distribution device, and identify a pair of ports connected through a same fiber jumper, and deliver port identities of the pair of connected ports to an apparatus for detecting a fiber jumper connection. The apparatus for detecting a fiber jumper connection may obtain, from port identities of ports that are supposed to be connected delivered by a management system and port identities of connected ports reported by the fiber distribution device, port identities of connected ports and unconnected ports that do not match the ports that are supposed to be connected. Because the fiber distribution device can send port identities of all pairs of connected ports on the fiber distribution device to the apparatus for detecting a fiber jumper connection, the apparatus for detecting a fiber jumper connection can determine which ports are connected incorrectly and which ports fail to be connected on the fiber distribution device, so as to maintain the connection of ports reported by the fiber distribution device and improve efficiency of detecting a fiber jumper connection.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for detecting a fiber jumper connection, comprising:
   receiving, by an apparatus for detecting a fiber jumper connection, first configuration information delivered by a management system, wherein the first configuration information comprises port identities of at least one pair of ports that are assigned to be connected on a fiber distribution device;
   receiving, by the apparatus for detecting a fiber jumper connection, second configuration information reported by the fiber distribution device, wherein the second configuration information comprises port identities of at least one pair of connected ports on the fiber distribution device;

matching, by the apparatus for detecting a fiber jumper connection, the ports that are assigned to be connected indicated by the first configuration information and the connected ports indicated by the second configuration information to obtain a matching result, wherein the matching result comprises port identities of connected ports and unconnected ports that do not match the ports that are assigned to be connected; and sending the matching result to the fiber distribution device to indicate which ports do not match the ports that are assigned to be connected.

2. A method for detecting a fiber jumper connection, comprising:

receiving first configuration information delivered by a management system, wherein the first configuration information comprises port identities of at least one pair of ports that are assigned to be connected on a fiber distribution device;

receiving second configuration information reported by the fiber distribution device, wherein the second configuration information comprises port identities of at least one pair of connected ports on the fiber distribution device; and matching the ports that are assigned to be connected indicated by the first configuration information and the connected ports indicated by the second configuration information to obtain a matching result, wherein the matching result comprises port identities of connected ports and unconnected ports that do not match the ports that are assigned to be connected, wherein after the matching result is obtained, further comprising:

sending the matching result to the fiber distribution device, so that the fiber distribution device turns on indicators on the connected ports and unconnected ports that do not match the ports that are assigned to be connected in the matching result.

3. The method according to claim 2, further comprising: supplying power to the fiber distribution device.

4. A method for detecting a fiber jumper connection, comprising:

receiving first configuration information delivered by a management system, wherein the first configuration information comprises port identities of at least one pair of ports that are assigned to be connected on a fiber distribution device;

receiving second configuration information reported by the fiber distribution device, wherein the second configuration information comprises port identities of at least one pair of connected ports on the fiber distribution device; and matching the ports that are assigned to be connected indicated by the first configuration information and the connected ports indicated by the second configuration information to obtain a matching result, wherein the matching result comprises port identities of connected ports and unconnected ports that do not match the ports that are assigned to be connected, further comprising:

receiving first connection information delivered by the management system, wherein the first connection information comprises port identities of at least one pair of ports to be connected on the fiber distribution device; and sending the first connection information to the fiber distribution device, so that the fiber distribution device turns on indicators on each pair of ports sequentially according to the port identities.

5. A method for detecting a fiber jumper connection, comprising:

receiving first configuration information delivered by a management system, wherein the first configuration information comprises port identities of at least one pair of ports that are assigned to be connected on a fiber distribution device;

receiving second configuration information reported by the fiber distribution device, wherein the second configuration information comprises port identities of at least one pair of connected ports on the fiber distribution device; and matching the ports that are assigned to be connected indicated by the first configuration information and the connected ports indicated by the second configuration information to obtain a matching result, wherein the matching result comprises port identities of connected ports and unconnected ports that do not match the ports that are assigned to be connected, further comprising:

receiving second connection information delivered by the management system, wherein the second connection information comprises port identities of at least two pairs of ports to be connected on the fiber distribution device;

sending the second connection information to the fiber distribution device, so that the fiber distribution device turns on an indicator on a first port in each pair of ports according to the port identities;

receiving third connection information sent by the fiber distribution device, wherein the third connection information comprises a port identity of the first port and a plug identity of a first plug of a fiber jumper plugged in the first port;

detecting sequentially a plug identity of a second plug of each fiber jumper whose first plug is plugged in the first port, and determining, according to the second connection information and the third connection information, a port identity of a second port in each pair of ports into which the second plug should be plugged, wherein the plug identity of the first plug matches the plug identity of the second plug for a same fiber jumper; and sending sequentially to the fiber distribution device the port identity of the second port into which the second plug of each fiber jumper should be plugged, so that the fiber distribution device turns on an indicator on each second port sequentially.

6. An apparatus for detecting a fiber jumper connection, comprising:

a receiver, configured to receive first configuration information delivered by a management system, wherein the first configuration information comprises port identities of at least one pair of ports that are assigned to be connected on a fiber distribution device; and receive second configuration information reported by the fiber distribution device, wherein the second configuration information comprises port identities of at least one pair of connected ports on the fiber distribution device;

a matching module, configured to match the ports that are assigned to be connected indicated by the first configuration information and the connected ports indicated by the second configuration information to obtain a matching result, wherein the matching result comprises port identities of connected ports and unconnected ports that do not match the ports that are assigned to be connected; and a sender configured to send the matching result to the fiber distribution device to indicate which ports do not match the ports that are assigned to be connected.

7. An apparatus for detecting a fiber jumper connection, comprising:
a receiver, configured to receive first configuration information delivered by a management system, wherein the first configuration information comprises port identities of at least one pair of ports that are assigned to be connected on a fiber distribution device; and receive second configuration information reported by the fiber distribution device, wherein the second configuration information comprises port identities of at least one pair of connected ports on the fiber distribution device; and
a matching module, configured to match the ports that are assigned to be connected indicated by the first configuration information and the connected ports indicated by the second configuration information to obtain a matching result, wherein the matching result comprises port identities of connected ports and unconnected ports that do not match the ports that are assigned to be connected, further comprising:
a sender, configured to send the matching result to the fiber distribution device, so that the fiber distribution device turns on indicators on the connected ports and unconnected ports that do not match the ports that are assigned to be connected in the matching result.

8. The apparatus according to claim 7, wherein:
the receiver is configured to receive first connection information delivered by the management system, wherein the first connection information comprises port identities of at least one pair of ports to be connected on the fiber distribution device; and the sender is further configured to send the first connection information to the fiber distribution device, so that the fiber distribution device turns on indicators on each pair of ports sequentially according to the port identities.

9. The apparatus according to claim 7, further comprising:
a power supply module, configured to supply power to the fiber distribution device.

10. An apparatus for detecting a fiber jumper connection, comprising:
a receiver, configured to receive first configuration information delivered by a management system, wherein the first configuration information comprises port identities of at least one pair of ports that are assigned to be connected on a fiber distribution device; and receive second configuration information reported by the fiber distribution device, wherein the second configuration information comprises port identities of at least one pair of connected ports on the fiber distribution device; and
a matching module, configured to match the ports that are assigned to be connected indicated by the first configuration information and the connected ports indicated by the second configuration information to obtain a matching result, wherein the matching result comprises port identities of connected ports and unconnected ports that do not match the ports that are assigned to be connected, wherein:
the receiver is specifically configured to receive second connection information delivered by the management system, wherein the second connection information comprises port identities of at least two pairs of ports to be connected on the fiber distribution device;
the sender is further configured to send the second connection information to the fiber distribution device, so that the fiber distribution device turns on an indicator on a first port in each pair of ports according to the port identities;
the receiver is further configured to receive third connection information sent by the fiber distribution device, wherein the third connection information comprises a port identity of the first port and a plug identity of a first plug of a fiber jumper plugged in the first port;
the apparatus further comprises a detecting module, configured to detect a plug identity of a second plug of each fiber jumper whose first plug is plugged in the first port, and determine, according to the second connection information and the third connection information, a port identity of a second port in each pair of ports into which the second plug should be plugged, wherein the plug identity of the first plug matches the plug identity of the second plug for a same fiber jumper; and
the sender is further configured to send sequentially to the fiber distribution device the port identity of the second port into which the second plug of each fiber jumper should be plugged, so that the fiber distribution device turns on an indicator on each second port sequentially.

11. A fiber configuration device, comprising:
a reading module, configured to read a plug identity of a fiber jumper plug plugged in each port on a fiber distribution device;
a processing module, configured to determine, according to the plug identity, at least one pair of connected ports on the fiber distribution device, wherein a plug identity of a first plug matches a plug identity of a second plug for a same fiber jumper; and
a sender, configured to report second configuration information to an apparatus for detecting a fiber jumper connection, wherein the second configuration information comprises port identities of at least one pair of connected ports on the fiber distribution device, so that the apparatus for detecting a fiber jumper connection matches ports that are assigned to be connected indicated by first configuration information delivered by a management system and the connected ports indicated by the second configuration information to obtain a matching result, wherein the matching result comprises port identities of connected ports and unconnected ports that do not match the ports that are assigned to be connected, and the first configuration information comprises port identities of at least one pair of ports that are assigned to be connected on the fiber distribution device.

12. The fiber configuration device according to claim 11, wherein an indicator is disposed on a port of the fiber configuration device;
the fiber configuration device further comprising a receiver configured to receive the matching result sent by the apparatus for detecting a fiber jumper connection; and
the processing module is further configured to turn on indicators on the connected ports and unconnected ports that do not match the ports that are assigned to be connected in the matching result.

13. The fiber configuration device according to claim 11, wherein:
the fiber configuration device further comprising a receiver configured to receive first connection information sent by the apparatus for detecting a fiber jumper connection, wherein the first connection information comprises port identities of at least one pair of ports to be connected on the fiber distribution device; and the processing module is further configured to turn on indicators on each pair of ports sequentially according to the port identities comprised in the first connection information.

14. The fiber configuration device according to claim 11, wherein:

the fiber configuration device further comprising a receiver configured to receive second connection information sent by the apparatus for detecting a fiber jumper connection, wherein the second connection information comprises port identities of at least two pairs of ports to be connected on the fiber distribution device;

the sender is further configured to send third connection information to the apparatus for detecting a fiber jumper connection, wherein the third connection information comprises a port identity of a first port and the plug identity of the first plug of the fiber jumper plugged in the first port;

the receiver is further configured to receive sequentially a port identity of a second port into which the second plug of each fiber jumper should be plugged sent by the apparatus for detecting a fiber jumper connection, and send the port identity to the fiber distribution device; and the processing module is further configured to turn on an indicator on each second port sequentially.

* * * * *